Patented Apr. 28, 1942

2,281,410

UNITED STATES PATENT OFFICE 2,281,410

RUBBER HYDROHALIDES STABILIZED WITH AMINOMETHYL UREAS

William James Burke and Franklin Traviss Peters, Wilmington, Del., assignors to E. I. du Pont de Nemours & Company, Wilmington, Del., a corporation of Delaware No Drawing. Application March 2, 1940, Serial No. 321,916

12 Claims. (Cl. 260—735)

This invention relates to rubber hydrohalides, especially rubber hydrochloride. More particularly it relates to thin sheets of rubber hydrochloride which do not readily deteriorate.

Rubber hydrochlorides and the corresponding other rubber hydrohalides deteriorate rapidly upon aging, exposure to light and subjection to elevated temperatures. This deterioration, may include photochemical disintegration.

This invention had for an object the preparation of rubber hydrohalide products, particularly rubber hydrochloride sheet wrapping materials which would not become brittle and/or fragile and/or dark-colored upon aging for long periods of time in the presence of air and/or upon subjection to elevated temperatures and/or upon exposure to light. The preparation of light, heat and age resistant rubber hydrochloride compositions suitable for sheets, continuous webs, filament solutions, coating compositions, molded articles and the like, constituted other objects. Another object was to prepare rubber hydrochloride articles stabilized with amino-methyl derivatives of urea. Still other objects were to provide a new class of materials for increasing the resistance of rubber hydrochloride to the action of both light and heat, and to provide light and heat resistance to rubber hydrochloride compositions suitable for use in the preparation of sheets, filaments, solutions, coating compositions, molded articles, and the like. A general advance in the art, and other objects which will appear hereinafter, are also contemplated.

It has now been found that resistant rubber hydrochloride compositions and articles can be produced by stabilizing rubber hydrochloride with amino-methyl-ureas.

The stabilizing effect of the amino-methyl-urea derivatives is shown in Table I following, in which a batch of rubber hydrochloride was divided into several parts and 10% (based on the weight of the rubber hydrochloride) of the stabilizing compound incorporated therein. The figures in the table indicate the time required for the loss of good film characteristics.

Table I

| Stabilizer | Sun-lamp | Fade-ometer (U.V. light) | Day-light | 65° C. dark |
|---|---|---|---|---|
| | Hours | Hours | Days | Days |
| Blank (no stabilizer) | 40 | 36 | 30 | 15 |
| s-Bis (di-butyl-aminomethyl) urea | 66 | 72 | 94 | 21 |
| s-Bis (di-methyl-aminomethyl) urea | 47 | 48 | 94 | 66 |
| s-Bis (morpholino - methyl) urea | 49 | 24 | 25 | 25 |
| s-Bis (di-ethyl-amino-methyl) urea | 32 | 24 | 18 | 32 |

From the following description and specific examples, in which are disclosed certain embodiments of the invention as well as details of what is believed to be the best mode for carrying out the invention, it will be apparent how the foregoing objects and related ends are accomplished. The parts are given by weight throughout the application.

EXAMPLE I

A batch of rubber hydrochloride was prepared by passing dry hydrogen chloride into a 5% solution of 15 minute milled pale crepe rubber in chloroform. The rubber hydrochloride was precipitated by methanol and after separation, was washed with methanol. Part of the washed product containing about 30% chlorine was dissolved in chloroform to form a 6% solution. To this solution there was added 10% (based on the weight of the rubber hydrochloride) of s-bis(di-butyl-amino-methyl) urea. Films were cast from the resultant clear solution on a chromium plated steel casting plate. The films were dried at 40° C. and thereafter stripped from the plate. These films, approximately 0.001% thick, were flexible, transparent, and strong. The films were exposed to the light from a mercury vapor lamp and to light from a carbon arc lamp for various periods of time, after which the flexibilities were found to be satisfactory up to the time indicated in Table II.

Table II

| Rubber hydrochloride | Carbon arc | Mercury vapor lamp |
|---|---|---|
| | Hours | Hours |
| Unmodified | 36 | 40 |
| Containing s-bis (di-butyl-amino-methyl) urea | 72 | 66 |

Strips of film from the unmodified rubber hydrochloride became brittle after heating at 65° C. for 15 days. Films of the rubber hydrochloride containing the 10% s-bis(di-butyl-amino-methyl) urea did not become brittle under the same conditions until after 21 days.

EXAMPLE II

To a 6% solution of rubber hydrochloride in chloroform was added 10% of s-bis(di-methyl-amino-methyl) urea, also called N:N'-(di-methyl-amino-methyl) urea. This modified rubber hydrochloride composition was suitable for the preparation of coatings and self-supporting films which retained their flexibility, tensile strength and toughness much longer than similar coatings and films prepared from the unmodified rubber hydrochloride.

Soft, transparent self-supporting films approximately 0.001 inch thick were prepared from the above composition by solvent evaporation.

The films retained in a large measure their flexibility, tensile strength and toughness for 94 days' aging under ordinary normal room conditions and exposure to sunlight from a skylight. Similar films prepared from the unmodified rubber hydrochloride were weak and brittle after 30 days' exposure under the same conditions.

When exposed to a temperature of 65° C. in a dark oven, the films containing the s-bis(dimethyl-amino-methyl) urea retained their excellent properties in large measure for 66 days, whereas films of the unmodified rubber hydrochloride failed after 15 days of exposure at the same temperature.

EXAMPLE III

To a 5% solution in chloroform of rubber hydrochloride was added 10% (based on the weight of the rubber hydrochloride) of s-bis(morpholino-methyl) urea, which dissolved readily in the solution. This composition was found to be suitable for the preparation of films (also coatings) which were resistant to deterioration with age. Thus, transparent, self-supporting films approximately 0.001 inch thick were prepared from the above composition by solvent evaporation (dry casting). These films retained in large measure their flexibility, tensile strength and toughness for 49 hours' aging under light from a mercury vapor lamp. Similar films of unmodified rubber hydrochloride became quite brittle after 40 hours' exposure under the same conditions.

Higher or lower concentrations of the s-bis-(morpholino-methyl) urea may be used. Self-supporting films were prepared from a rubber hydrochloride composition similar to the above, but containing 5% of the same urea derivative, and were aged at 65° C. in a dark oven. These films retained the good film properties during 30 days' aging at 65° C., whereas similar films from some of the unmodified rubber hydrochloride failed in 15 days at the same temperature.

EXAMPLE IV

Transparent films were prepared from a rubber hydrochloride composition similar to that of Example I, but containing only 5% (based on the weight of the rubber hydrochloride) of s-bis(1-piperidyl-methyl) urea as a stabilizer. These films were exposed in a standard Fadeometer and retained their tensile strength, flexibility and toughness in large measure after 65 hours' exposure. Similar films of unmodified rubber hydrochloride were weak and brittle after 36 hours' exposure in the Fadeometer.

EXAMPLE V

Transparent films were prepared from a composition similar to that of Example I, containing 5% of rubber hydrochloride and 10% of s-bis-(hexamethyleneimino-methyl) urea, the percentage of the latter being based upon the weight of the rubber hydrochloride. These films, when exposed in a standard Fadeometer, retained their flexibility, tensile strength and toughness in large measure after 75 hours' exposure. Similar films of unmodified rubber hydrochloride were weak and brittle after 36 hours' exposure in the Fadeometer.

The amount of the amino-methyl-urea ordinarily used falls within the range 0.5% to 12%, based on the weight of the rubber hydrochloride. The intermediate range of 1% to 10%, and usually the still more specific range of 1% to 5%, has been found preferable. For special purposes more than 12% may be used.

In the preparation of transparent films from rubber hydrochloride compositions containing the condensation products of dimethylol urea with primary amines and with secondary amines, it is preferred that the amino methyl urea derivative be compatible with the rubber hydrochloride and be used in an amount which is compatible with the rubber hydrochloride. It is also preferred that it be soluble in solvents for rubber hydrochloride (chloroform, carbon tetrachloride, benzene, toluene, methylene chloride and the like). When transparency is not essential, it is not necessary that the methylol urea derivative (amino-methyl urea) be completely compatible with the rubber hydrochloride or that it be used in an amount which is compatible with the rubber hydrochloride.

The preferred stabilizers are s-bis(dimethyl-amino-methyl) urea, s-bis(di-ethyl-amino-methyl) urea, s-bis(di-propyl-amino-methyl) urea, s-bis(di-butyl-amino-methyl) urea, s-bis-(di-octyl-amino-methyl) urea, s-bis(di-stearyl-aminomethyl) urea, s-bis(1-pyrryl-methyl) urea, s-bis (1-pyrrolidyl-methyl) urea, s-bis(1-piperidyl-methyl) urea, s-bis(morpholino-methyl) urea, s-bis(hexamethylenimino-methyl) urea, s-bis(di-phenyl-amino-methyl) urea, and s-bis-(di-benzyl-amino-methyl) urea.

The amino-methyl-urea stabilizers of this invention, which can be prepared by the procedure described by Einhorn (Ann. 361, p. 139, 1908), are comprehended by the general structural formula:

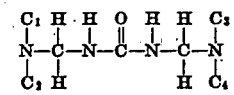

when $C_1$ and $C_2$ are terminal carbon atoms of one or two chains and $C_3$ and $C_4$ are terminal carbon atoms of one or two chains.

When $C_1$, $C_2$, $C_3$ and $C_4$ are the terminal atoms of four chains, it is preferred that the radicals (chains, residues, groups, nuclei) be aliphatic hydrocarbon radicals of 1 to 20 carbon atoms. The s-bis(dialkyl-amino-methyl) ureas, in which each of the alkyl groups contain 1, 2, 3 or 4 carbon atoms, have given excellent results. The compounds in which $C_1$, $C_2$, $C_3$ and $C_4$ are of identical alkyl groups appear to be more readily available.

A marked improvement in the stability of the rubber hydrochloride composition is obtained when $C_1$, $C_2$, $C_3$ and $C_4$ are carbon atoms of aromatic radicals, but such compounds are less effective than the alkylamino-methyl ureas.

The cyclo-aliphatic derivatives (wherein $C_1$ and $C_2$ are terminal atoms of one (the same) hydrocarbon chain and $C_3$ and $C_4$ are the terminal atoms of the same hydrocarbon chain, are equivalent in effectiveness to the aliphatic derivatives. Specific compounds of this class are the piperidine, hexamethyleneimine, etc., condensation products of di-methylol-urea.

Amino-methyl-urea substitution derivatives in which $C_1$, $C_2$, $C_3$ and $C_4$ are terminal alphyl carbon atoms of aralkyl groups of 1 to 20 carbon atoms are somewhat less effective than the related aliphatic compounds, but more effective than the aromatic compounds.

Compounds of the type:

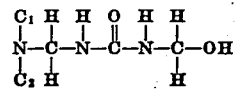

are effective as far as stabilization of rubber hydro-chloride is concerned but, because of a tendency to liberate formaldehyde, are less satisfactory to use.

Compounds of the type:

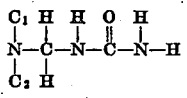

are more stable and hence more satisfactory to employ as stabilizers.

The stabilizers may be used singly or in combination.

The stabilizer may be introduced into the rubber hydrochloride composition in any suitable manner, for example, by the use of a neutral solvent, by milling, by grinding or kneading, and the like.

The rubber hydrochloride may be prepared by any of the various methods known to the art, for example, by the addition of gaseous hydrogen chloride to rubber dissolved in a chlorinated solvent, by the treatment of rubber with solutions of substantially anhydrous hydrogen chloride in a non-solvent for the rubber (ethyl acetate and the like), by the reaction of rubber with liquid substantially anhydrous hydrogen chloride at low temperatures (such as —80° C.), and the like.

The rubber hydrochloride employed preferably has a combined chlorine content of 28% to 32%, but comparable results are obtained with material whose chlorine content is within the range 26% to 34%.

Either amorphous or crystalline varieties, or mixtures of these varieties, may be employed. Mixtures of rubber hydrochlorides of different chlorine contents may be employed, for example, various production batches may be blended.

In the preparation of the compositions of this invention, it is preferable to employ a neutral rubber hydrochloride from which free hydrogen chloride (if any) has been removed by any suitable method, for example, by washing the rubber hydrochloride with methanol, by treatment of the rubber hydrochloride (which may be in solution) with basic material such as alkali carbonates, hydroxides, oxides and the like, alkaline earth carbonates, hydroxides, oxides and the like, with organic amines and the like, followed by removal of the basic material (and its salt).

One very desirable method for preparing the rubber hydrochloride is to saturate (at room temperature) a 3% solution (in chloroform) of 30 minute milled pale crepe rubber with dry hydrogen chloride, and to thereafter pass additional hydrogen chloride into the solution for 48 hours (with stirring). The resulting solution is then poured slowly into a large excess of methanol, whereby the rubber hydrochloride is precipitated. The product is then washed with methanol until the washings are neutral to bromthymol. For convenience in handling, the rubber hydrochloride may then be redissolved in chloroform to produce a 5% solution. The chlorine content of this rubber hydrochloride should be 30.5% to 31.5%.

The new compositions may also contain, in addition to the stabilizing material which curbs or restrains the deterioration, one or more modifying agents such as natural resins, synthetic resins, waxes, wax substitutes, wax-like materials, wax blending agents, oils, drying oils, driers, fats, anti-static agents, slip agents, pigments, metallic powders, fillers, dyes, plasticizers, etc. Minor proportions of other film forming materials and stabilizers, singly or in combination, may be employed.

Compositions of glass-clear transparency can readily be prepared according to this invention, because of the excellent solubility and compatibility of the stabilizers. The stabilizers cause no substantial change in the film-forming properties of the rubber hydrochloride, and may, for this reason, be used in large amounts (if this is desirable considering the specific purpose to which the composition is to be put) than stabilizers heretofore proposed in the art. An additional advantage for compositions of this invention resides in the fact that the stabilizers do not evaporate from the compositions. As a result, the compositions retain their resistance to light and heat over long periods of time, a characteristic heretofore unknown because the only organic stabilizers considered suitable for rubber hydrohalides were volatile.

Rubber hydrochloride compositions containing amino-methyl-urea-derivatives may be dissolved in solvents in any manner known to the art, and may be used in the preparation of transparent sheeting for wrapping purposes, protective coatings and the like. The compositions may be milled for the purpose of reducing the viscosity of the composition in order to obtain a high solids coating composition. In addition, these rubber hydrochloride compositions may be rolled and calendered into sheets or molded under heat and pressure into articles of commerce. The compositions may be used for lamination by heat and pressure or with adhesives, and for the coating of paper, sheets of regenerated cellulose, transparent sheets and films of all kinds, synthetic or natural filaments and fibers, textiles, wood, metal, stone, ceramic materials, glass, and the like, and may be used as adhesives.

The multitude of uses for rubber hydrochloride are well known to the art, and need not be repeated here. The compositions of the present invention are especially suited for the preparation of thin (that is, on the order of a few ten-thousandths to a few hundredths of an inch in thickness) sheet material, particularly transparent, self-supporting films which are highly durable, tear resistant, and water resistant. Films of such compositions resist or repress the action of heat and the action of light.

As many apparently widely different embodiments of this invention may be made without departing from the spirit and scope thereof, it is to be understood that this invention is not limited to the specific embodiments thereof except as defined in the appended claims.

We claim:

1. A composition of matter which includes a rubber hydrohalide and s-bis (morpholino-methyl) urea in such an amount as to retard photochemical disintegration of the rubber hydrohalide but not exceeding 12% of the rubber hydrohalide.

2. A composition of matter which includes a rubber hydrohalide and 1%—10% of material of the formula:

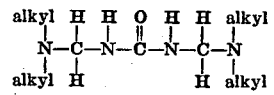

wherein the alkyl groups have 1 to 20 carbon atoms.

3. A composition consisting essentially of rubber hydrochloride of 26%–34% chlorine content together with 0.5% to 12% (based on the rubber hydrochloride) of s-bis(di-butyl-amino-methyl) urea.

4. The method of preserving rubber hydrochloride which comprises incorporating into the rubber hydrochloride 1%–10% of material possessing the structural formula:

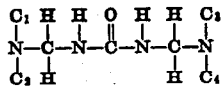

wherein $C_1$ and $C_2$ are terminal carbon atoms of an aliphatic hydrocarbon chain and $C_3$ and $C_4$ are terminal carbon atoms of an aliphatic hydrocarbon chain.

5. A composition of matter comprising rubber hydrohalide stabilized with 0.5% to 12% of one or more aminomethyl ureas.

6. A composition of matter comprising rubber hydrohalide stabilized with one or more aminomethyl ureas, the amount of aminomethyl urea being sufficient to retard photochemical disintegration but not exceeding 12% of the rubber hydrohalide.

7. A composition of matter comprising rubber hydrochloride stabilized with one or more aminomethyl ureas, the amount of aminomethyl urea being sufficient to retard photochemical disintegration but not exceeding 12% of the rubber hydrochloride.

8. A composition of matter comprising rubber hydrohalide stabilized with 0.5% to 12% of material of the formula:

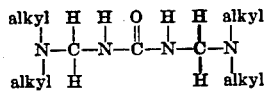

wherein the alkyl groups have 1 to 20 carbon atoms.

9. A composition of matter comprising rubber hydrohalide stabilized with material of the formula:

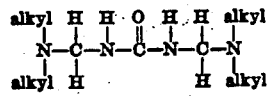

wherein the alkyl groups have 1 to 20 carbon atoms, the amount of the stabilizer being sufficient to retard photochemical disintegration but not exceeding 12% of the rubber hydrohalide.

10. A composition of matter comprising rubber hydrochloride stabilized with 0.5% to 12% of material of the formula:

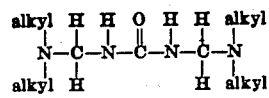

wherein the alkyl groups have 1 to 20 carbon atoms.

11. A composition consisting essentially of rubber hydrochloride of 26%–34% chlorine content together with 0.5%–12% (based on the rubber hydrochloride) of s-bis(di-methyl-aminomethyl) urea.

12. The method of preserving rubber hydrochloride which comprises incorporating into the rubber hydrochloride 0.5%–12% of material possessing the structural formula:

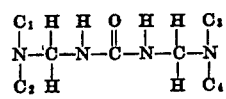

wherein $C_1$ and $C_2$ are terminal carbon atoms of an aliphatic hydrocarbon chain and $C_3$ and $C_4$ are terminal carbon atoms of an aliphatic hydrocarbon chain.

WILLIAM JAMES BURKE.
FRANKLIN TRAVISS PETERS.